United States Patent [19]

Kady et al.

[11] Patent Number: 5,533,058
[45] Date of Patent: Jul. 2, 1996

[54] METHOD AND APPARATUS FOR LOW CURRENT RF SIGNAL DETECTION

[75] Inventors: Mark A. Kady, Greentown; Vincent M. Wenos, Kokomo, both of Ind.

[73] Assignee: Delco Electronics Corporation, Kokomo, Ind.

[21] Appl. No.: 208,177

[22] Filed: Mar. 10, 1994

[51] Int. Cl.$^6$ .................................................. H04L 25/06
[52] U.S. Cl. ............................ 375/317; 375/319; 455/343
[58] Field of Search .................................. 375/75, 76, 55, 375/87, 317, 318, 319; 341/70, 71; 455/343

[56] References Cited

U.S. PATENT DOCUMENTS

| | | | |
|---|---|---|---|
| 4,257,125 | 3/1981 | Theall, Jr. ................................ | 375/55 |
| 4,555,667 | 11/1985 | Cressey et al. ........................... | 375/76 |
| 4,606,050 | 8/1986 | Sekigawa et al. ........................ | 375/75 |
| 5,150,954 | 9/1992 | Hoff ......................................... | 455/343 |
| 5,170,396 | 12/1992 | Rivers et al. ............................. | 375/87 |
| 5,287,359 | 2/1994 | Engelse ................................... | 375/87 |

Primary Examiner—Stephen Chin
Assistant Examiner—Huong Luu
Attorney, Agent, or Firm—Jimmy L. Funke

[57] ABSTRACT

A low signal detection circuit for use in an electronic tolling system which wakes up a receiver circuit associated with the tolling system based upon the type of signal received. An RF signal transmitted by the electronic tolling system is Manchester encoded and will therefore have a frequency within predetermined values. The system will detect the incoming RF signals or count the rising and falling edges of the baseband signal and apply the counts to a threshold circuit which will compare the number of counts to a predetermined value. If the number of counts falls within a predetermined range, then a signal indicating the presence of a valid RF signal will be output from the wake-up circuit. A power management circuit receives a clock signal from an oscillator circuit and provides a power signal which will wake up the detection circuitry for only a minimum predetermined period of time.

15 Claims, 1 Drawing Sheet

5,533,058

METHOD AND APPARATUS FOR LOW CURRENT RF SIGNAL DETECTION

BACKGROUND OF THE INVENTION

1. Field of the Invention

This invention relates generally to a method and apparatus for detection of an RF signal and, more particularly, to a low current RF signal detection circuit for use in electronic tolling.

2. Discussion of the Related Art

As any seasoned traveler or commuter knows, toll roads, toll bridges and the like are a significant part of the highway transit system. In order to provide funds for the maintenance and upkeep of toll roads and bridges, users are required to pay a fee related to the use of these roads and bridges. Generally, at a toll area, a series of toll booths extend across a roadway, and users are obligated to pay the toll rate in order to pass. Alternately, in a toll road situation, travelers will receive toll cards at toll booths as they enter a toll area, and then will pay the required fee depending on the point of exit of the toll area. In either of these situations, the commuter is required to stop his or her vehicle either to receive the toll card or pay the toll fee. Sometimes, depending on traffic congestion, users must wait significant periods of time before arriving at the toll booths. As a result, toll road and toll bridge users are inconvenienced beyond that of the extraction of funds.

In order to alleviate the inconvenience to the commuter, and reduce the expense of the tolling system, and thus hopefully the toll, it is known to use electronic tolling in which tolling booths, as well as the personnel required to operate them, are substantially eliminated. Electronic tolling is a process by which communications between a transponder associated with a vehicle and a roadside reader make a record of the vehicle operator's use of the toll road or toll bridge. In these types of systems, the roadside reader will continuously emit an RF signal which will be received by the transponder of the vehicle when the vehicle enters the tolling area. Upon receipt of the transmitted signal from the roadside reader, the transponder of the vehicle will emit an encoded signal to the roadside reader such that the roadside reader can identify the vehicle. Upon identification of the vehicle, the roadside reader will initiate a billing sequence. Different protocols for determining and billing the toll are known in the art.

The transponder in the vehicle is battery powered, usually by a 3 volt lithium battery. Because of this, it is important to attempt to limit the power drain on the vehicle transponder to times when the transponder is receiving a valid signal from the roadside reader in order to conserve battery life, and thus the need to replace the battery. For this reason, the vehicle transponders will generally include a signal detection circuit which monitors RF frequency signals, and when a valid tolling signal is present, cause power to be delivered to the transmitter and data analysis circuitry associated with the vehicle transponder.

FIG. 1 shows a prior art signal detection circuit 10 which is applicable to be used in a vehicle transponder (not shown) in order to wake-up subsequent data analyzing circuitry and a transmitter (not shown) when a valid tolling signal is present. An antenna (not shown) associated with the vehicle transponder receives RF signals and applies the signals to a band pass filter (not shown). The detection circuit 10 receives the RF signals from the filter. The signals are rectified by a rectifying diode 12 such that the carrier is removed and only the modulation signals will reach a positive terminal of a comparator 14. A signal is applied to the comparator 14 on an input power line 16 from a data analyzer circuit (not shown) at an intermittent rate in order to periodically power up the comparator 14. Typically, this rate is at about a 10% duty cycle of a clock signal associated with the data analyzing circuit. The power signal is also applied as a DC bias through a resistor $R_1$ along with the RF input signal to the positive terminal of the comparator 14. The power signal is further applied to a negative terminal of the comparator 14 through a resistor $R_2$. A potentiometer 18 adjusts the sensitivity of the comparator 14. The sensitivity of the comparator 14 is generally set for a relatively strong signal level. A second diode 20 is provided to compensate for temperature differences, and is matched to the diode 12. A capacitor $C_1$ is used as a by-pass filter. Once the voltage on the positive terminal of the comparator 14 falls below the voltage on the negative terminal of the comparator 14, a signal present signal is outputted from the comparator 14. Once the signal detection circuit 10 determines that a valid signal is present, the data analyzing circuit will wake up and will receive the input from the positive terminal input of the comparator 14 in order to determine the tolling information.

Although the detection circuit 10 offers a number of advantages for waking up the data analyzing circuit of the transponder of the vehicle, there is still room for improving this system. One problem with the circuit 10 is the increased costs associated with providing matched diodes. However, a more serious problem involves the variability in turn on level over temperature and false wake-ups associated with the sensitivity requirements. Both of these factors affect the battery life of the vehicle transponder. If the potentiometer 18 is adjusted to increase the sensitivity too much, the circuit 10 may indicate a signal is present on noise or weak RF interference and drain the battery. Likewise, too low of a sensitivity may result in no detection when a valid roadside transponder message is being sent.

What is needed is a signal detection circuit for use in electronic tolling systems which distinguishes between the desired RF transmission and other RF transmission in order to only wake up the data analyzing circuitry when a valid signal is present. It is therefore and object of the present invention to provide such a signal detection circuit.

SUMMARY OF THE INVENTION

In accordance with the teaching of the present invention, a low current RF signal detection circuit is disclosed which provides a wake-up signal to a receiver and data analyzing circuit in an electronic tolling system depending on the known transmission features of an RF input signal. RF input signals are applied through a rectifying diode to a positive terminal of a comparator. The rectifying diode provides a baseband signal. An oscillator provides a clock signal to a power management circuit and to a counter circuit. The power management circuit intermittently applies power to the comparator, the counter circuit, and a threshold circuit at a five percent duty cycle of the oscillator. During the time the comparator receives the timing signal from the power management circuit, baseband data signals from the rectifying diode are combined with a bias signal and applied to the comparator to be amplified. The counter circuit counts either rising or falling edges of the baseband signal from the comparator and applies a count of this value to the threshold circuit. The threshold circuit compares the counts from the counter circuit to a predetermined range of counts in order to determine if the incoming RF signal falls within the range and is thus valid. Because RF signals in electronic tolling systems are Manchester encoded, it is possible to determine what the minimum and maximum frequency of the baseband signal will be so as to set the threshold counts to a desirable range.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments concerning a low signal detection circuit for an electronic tolling system is merely exemplary in nature and is in no way intended to limit the invention or its applications or uses.

Figure 2:
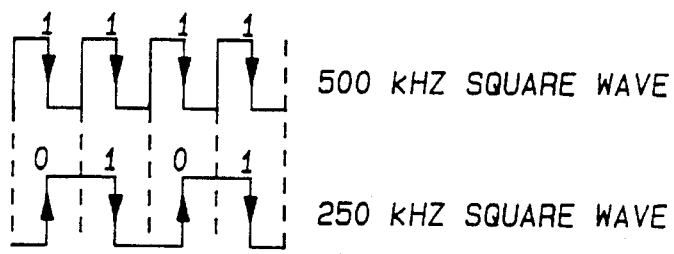
FIG. 2 is a pair of waveforms showing the maximum and minimum frequencies for a Manchester encoded electronic tolling data signal.

Roadside readers associated with current electronic tolling systems generally transmit a Manchester encoded RF data signal to be received by a receiver associated with a vehicle as it enters a tolling area. Manchester encoded data is a popular method of encoding data bits for transmission, well known to those skilled in art, in which a clock signal and the data bits are encoded on a single signal. A signal that is Manchester encoded will be a square wave in which a falling mid-bit transition represents a "1" bit and a rising mid-bit transition represents a "0" bit. Manchester encoded electronic tolling signals from the Roadside reader will transmit RF data signals at 500 kilobits per second (kbps). Because the number of bits being transmitted is the same regardless of the bit values, the highest bit value that can be achieved under Manchester encoding is 111 . . . 1. This bit sequence results in a 500 kHz square waveform as shown by the top waveform of FIG. 2. Likewise, the minimum bit value that can be achieved under Manchester encoding is 0101 . . . 01. This is a 250 kHz square wave as shown by the bottom waveform of FIG. 2. As is apparent by viewing these waveforms, falling mid-bit transitions are shown as "1", rising mid-bit transitions are shown as "0", and the number of bits transmitted is the same.

Figure 1:
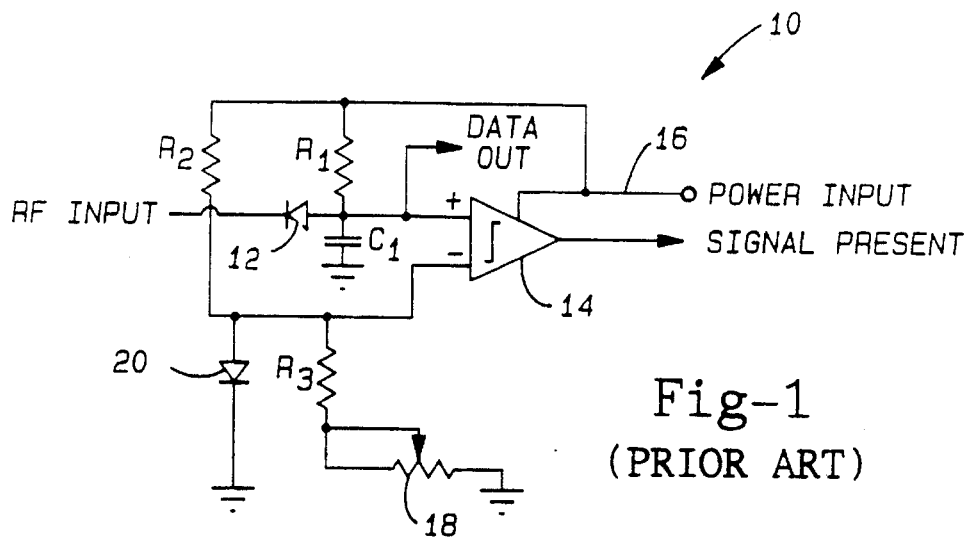
FIG. 1 is a prior art schematic diagram of a signal detection circuit for use in an electronic tolling system.
Figure 3:
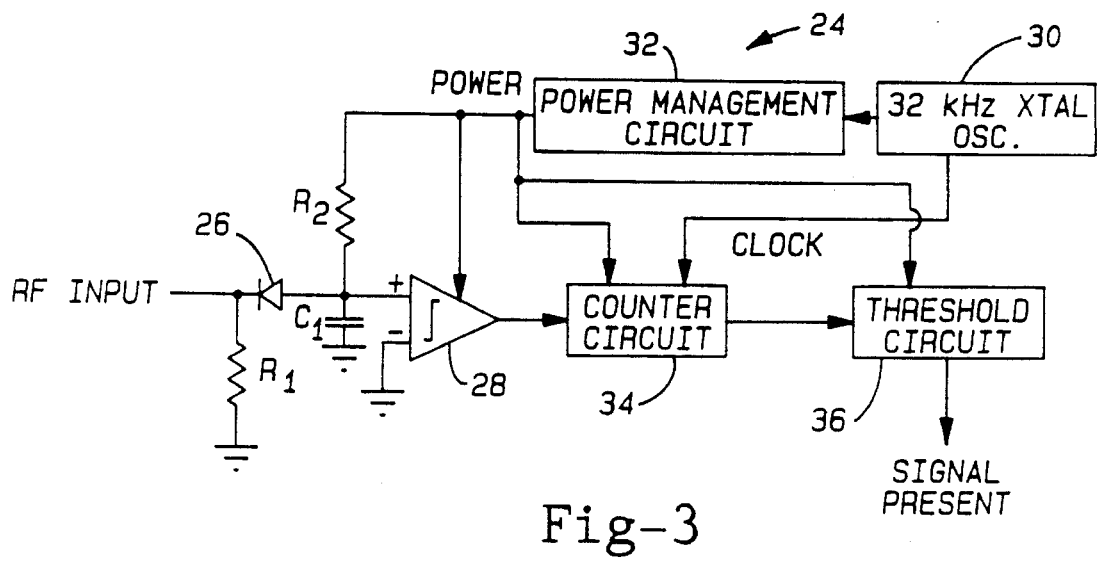
FIG. 3 is a schematic block diagram of a low signal detection circuit according to a preferred embodiment of the present invention.

FIG. 3 shows a schematic block diagram of a signal detection circuit 24 according to a preferred embodiment of the present invention. RF signals are received by an antenna (not shown), sent through a band pass filter (not shown), and are applied as input signals to a detector diode 26 and associated resistor $R_1$. Input signals are stripped of their carrier by the diode 26 the detected signal is applied to the positive terminal of a comparator 28. A 32.768 kHz crystal oscillator 30 applies a clock output signal to a power management circuit (PMC) 32 and a counter circuit 34. The PMC 32 provides a power signal to the comparator 28 only at predetermined times during the clock cycle, as will be discussed below. The signal from the PMC 32 is also a DC bias voltage applied to the positive terminal of the comparator 28. Signals which pass the diode 26 are baseband signals which are combined with the DC bias voltage. An output of the comparator 28 is an amplified baseband signal which is applied to the counter circuit 34. During the appropriate clock times, as determined by the clock input signal to the counter circuit 34, the counter circuit 34 counts the rise or fall of the pulses in the baseband signal. An output of the number of counts from the counter circuit 34 is applied to a threshold circuit 36. The threshold circuit 36 compares the counts to a predetermined count range stored in the threshold circuit 36 in order to determine if a valid signal is present. If the number of counts is within the predetermined range, an output of the threshold circuit 36 will indicate a signal is present to the receiver circuit (not shown) in the same manner as the signal above with reference to the comparator 14 of FIG. 1.

In order to minimize power consumption, the proposed system operates at about a five percent duty cycle of the 32.768 kHz oscillator. In this regard, the system is powered on for two clock cycles, where each clock cycle is about 30.52 μs (microseconds). During the first clock cycle of the oscillator 30, the PMC 32 causes the comparator 28 and the counter circuit 34 to stabilize because one clock cycle does not give enough time for the circuit components to recover data. During the next clock cycle, the comparator 28 amplifies the signal at its input to complementary metal oxide semiconductor (CMOS) logic levels and the counter circuit 34 a synchronously counts the edges of pulses being output from the comparator 28. By this, the circuit 24 is on for a period of approximately 61.04 μs, and then is off for approximately 1.16 ms (milliseconds), where 61.04 is 5% of 1.22 ms. Every 1.22 ms the comparator will be analyzing RF input signals for one clock cycle. If the threshold circuit 36 determines that a valid signal is present, the power management circuit 32 will maintain power to the positive terminal of the comparator 28 until the transaction between the vehicle transponder and the roadside reader is complete. Then the PMC 32 will return to a 5% duty cycle operation.

The threshold circuit 36 compares the number of counts being output from the counter circuit 34 during the second clock cycle to determine whether a valid signal is present. The threshold range of the threshold circuit 36 is determined by the maximum and minimum counts given the range of clock tolerances and the circuit settling times. The maximum frequency of a valid incoming signal is set as 525 kHz. 525 kHz is the maximum expected Manchester encoded frequency, discussed above, plus a five percent error. The maximum count time is 30.55 μs. This is the five percent 30.52 μs of the frequency of the oscillator 30 plus a 0.1% error. Therefore, the maximum count value would be 16.04, which is then rounded up to 17. The minimum count value is based on the expected Manchester encoded minimum frequency. That value would be 250 kHz minus a five percent error or 237.5 kHz. The minimum count is 20.48 μs. This is 10 μs additional settling time and 32,768 kHz minus 0.1% clock error. This result is a minimum clock value of 4.86 which is then rounded down to 4. Therefore, if the counter circuit 34 determines a count from 4 to 17, then the output of the threshold circuit 36 will cause the receiver and data analyzing circuit to wake up.

The circuit 24 is much less susceptible to false wake-up signals than the circuit 10 because amplitude shift keying data must be present with a signal spectral content between 131 kHz and 830 kHz before the signal present signal is set. Most other communications in or near the 915 MHz band are a constant carrier, either binary phase shift keying or frequency shift keying for a system such as cellular telephones, automatic vehicle monitoring, spread spectrum, etc. Further, these communications do not switch on or off at the required high frequency data rate. Therefore, the probability of false wake-up is reduced considerably if not eliminated entirely and the transponder in the vehicle will operate up to its rated battery life.

RF level sensitivity of the circuit 24 is not critical since it is not based on received signal strength. All that is required is that the minimum level of sensitivity is met in order to guarantee the functionality of the counter circuit. The maximum sensitivity is not critical, and can be at any level. This fact eliminates the need for an adjustment and allows the circuit to eliminate the temperature effects.

Quiescent current is reduced by using a 32 kHz low power oscillator, low power CMOS digital circuitry and a 5% duty cycle. The on time is 61.04 microseconds resulting in a fast signal detection time (less than 1.22 milliseconds). The fast detection time provides tolling system advantage by increasing the time the strength tag is communicating in the reader zone and this results in more system throughput.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A signal detection circuit for indicating whether an radio frequency (RF) input signal is a valid predetermined input signal, said signal detection circuit comprising:

a comparator receiving the RF input signal and generating an output baseband signal;

a counter circuit receiving the baseband signal from the comparator, said counter circuit counting predetermined edges of the baseband signal and providing a counter output signal indicating a number of counted edges;

an oscillator, said oscillator applying a clock signal to the counter circuit, wherein the clock signal is asynchronous with respect to the RF input signal; and a threshold circuit receiving the counter output signal, said threshold circuit comparing the number of counted edges to a threshold range of counts, and providing a threshold output signal when the number of counted edges is within the threshold range of counts, thereby indicating that the RF input signal is valid.

2. The signal detection circuit according to claim 1 further comprising a diode which receives the input signal prior to being received by the comparator, said diode detecting the RF input signal.

3. The signal detection circuit according to claim 1 further comprising a power management circuit which receives the clock signal from the oscillator and outputs a power signal to the comparator at predetermined time intervals defined by the clock signal.

4. The signal detection circuit according to claim 3 wherein the power management circuit applies the power signal to the comparator at a predetermined percent duty cycle of the oscillator.

5. The signal detection circuit according to claim 4, wherein the predetermined RF input signal is Manchester encoded with minimum and maximum bit values represented respectively by first and second frequencies of square waveforms and the threshold range of counts is determined by the predetermined percent duty cycle of the oscillator and the first and second frequencies of the square waveforms.

6. The signal detection circuit according to claim 5 wherein the oscillator runs at 32.768 kHz, the predetermined percent duty cycle is 5%, the minimum and maximum bit values are represented respectively by 250 kHz and 500 kHz square waveforms, and the threshold range of counts is from 4 to 17 counts.

7. The signal detection circuit according to claim 1 wherein the threshold output signal is applied to circuitry associated with a transponder of an electronic tolling system.

8. A method of detecting an input signal, said method comprising the steps of:

applying the input signal to a comparator, wherein the comparator generates an output baseband signal;

providing a counter circuit which receives the output baseband signal from the comparator, said counter circuit counting predetermined edges of the output baseband signal and providing a counter output signal indicating a number of counted edges;

providing an oscillator, said oscillator applying a clock signal to the counter circuit, the clock signal being asynchronous with respect to the input signal; and providing a threshold circuit which receives the counter output signal, said threshold circuit comparing the number of counted edges to a threshold range of counts and providing a threshold output signal when the number of counted edges is within the threshold range of counts to indicate that the input signal is a valid predetermined input signal.

9. The method according to claim 8 further comprising the step of providing a power management circuit, said power management circuit receiving the clock signal from the oscillator and outputting a power signal to the comparator at predetermined time intervals defined by the clock signal.

10. The method according to claim 9 wherein the power management circuit outputs the power signal to the comparator at a predetermined percent duty cycle of the oscillator.

11. The method according to claim 10 wherein the predetermined input signal is Manchester encoded with minimum and maximum bit values represented respectively by first and second frequencies of square waveforms and the threshold range of counts is determined by the predetermined percent duty cycle of the oscillator and the first and second frequencies of the square waveforms.

12. The method according to claim 11 wherein the oscillator runs at 32.768 kHz, the predetermined percent duty cycle is 5%, the minimum and maximum bit values are represented respectively by 250 kHz and 500 kHz square waveforms, and the threshold range of counts is from 4 to 17 counts.

13. A signal detection circuit for indicating whether an input signal is a valid predetermined Manchester encoded signal, said signal detection circuit comprising:

a comparator receiving the input signal and generating a baseband signal;

an oscillator generating a clock signal, the clock signal being asynchronous with respect to the input signal;

a power management circuit receiving the clock signal and applying a power management signal to the comparator at predetermined time intervals defined by the clock signal;

a counter circuit receiving the baseband signal from the comparator and the clock signal from the oscillator, said counter circuit counting predetermined edges of the baseband signal and providing a counter output signal indicating a number of counted edges; and a threshold circuit receiving the counter output signal, said threshold circuit comparing the number of threshold range of counts and providing a threshold output signal to indicate the input signal is valid and Manchester encoded when the number of counted edges is within the threshold range of counts.

14. The signal detection circuit according to claim 13 wherein the power management circuit applies the power management signal to the comparator at a predetermined percent duty cycle of the oscillator.

15. The signal detection circuit according to claim 14 wherein the valid predetermined Manchester encoded signal has minimum and maximum bit values represented respectively by first and second frequency square waveforms, and the threshold range of counts is determined based upon the predetermined percent duty cycle of the oscillator and the first and second frequencies of the square waveforms representing the minimum and maximum bit values of the Manchester encoded signal.

* * * * *